(12) United States Patent
Tsai et al.

(10) Patent No.: US 12,140,794 B2
(45) Date of Patent: Nov. 12, 2024

(54) LIGHT SOURCE MODULE AND DISPLAY MODULE

(71) Applicant: E Ink Holdings Inc., Hsinchu (TW)

(72) Inventors: Yi-Yu Tsai, Hsinchu (TW); Ching-Huan Liao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/500,103

(22) Filed: Nov. 1, 2023

(65) Prior Publication Data
US 2024/0241304 A1    Jul. 18, 2024

(30) Foreign Application Priority Data
Jan. 12, 2023    (TW) .................................. 112101304

(51) Int. Cl.
*F21V 8/00* (2006.01)

(52) U.S. Cl.
CPC .................... *G02B 6/0073* (2013.01)

(58) Field of Classification Search
CPC .................................................. G02B 6/0073
See application file for complete search history.

(56) References Cited

U.S. PATENT DOCUMENTS

| | | | |
|---|---|---|---|
| 7,642,708 B2 | 1/2010 | Juestel et al. | |
| 8,809,893 B2 | 8/2014 | Choi et al. | |
| 9,224,927 B2 * | 12/2015 | Kang | G02F 1/1368 |
| 11,236,869 B2 | 2/2022 | Kim et al. | |
| 2010/0157406 A1 * | 6/2010 | Gruhlke | G02B 26/001 977/774 |
| 2014/0119052 A1 | 5/2014 | Hayama | |
| 2017/0153526 A1 * | 6/2017 | Okabe | G02F 1/167 |
| 2021/0097943 A1 * | 4/2021 | Wyatt | H10K 59/352 |
| 2022/0342272 A1 * | 10/2022 | Liao | G02F 1/133624 |

FOREIGN PATENT DOCUMENTS

| | | |
|---|---|---|
| CN | 107688271 A | 2/2018 |
| CN | 113467150 A | 10/2021 |
| TW | 201621441 A | 6/2016 |
| TW | 202242462 A | 11/2022 |

OTHER PUBLICATIONS

The office action of corresponding TW application No. 112101304 issued on Nov. 15, 2023.

* cited by examiner

*Primary Examiner* — Mary Ellen Bowman
(74) *Attorney, Agent, or Firm* — CKC & Partners Co., LLC (57) ABSTRACT

A light source module includes a light guide plate including a light entrance surface and a light source adjacent to the light entrance surface. The light source includes a light emitting device to emit a blue light, a first wavelength conversion unit on the light emitting device and a second wavelength conversion unit on the light emitting unit. When the blue light is incident to the first wavelength conversion unit, the blue light is converted into a first light. The first light has a wavelength in a range from 480 nm to 650 nm. When the blue light is incident to the second wavelength conversion unit, the blue light is converted to a second light. The second light has a wavelength different from the wavelength of the first light. The blue light, the first light and the second light combine to produce a white light.

15 Claims, 7 Drawing Sheets

|  | White screen : WS | | Dark screen : DS | | Color shift (△E to FL off) | |
|---|---|---|---|---|---|---|
|  | a* | b* | a* | b* | White screen : WS | Dark screen : DS |
| Front light off ; FL off | -2.8 | 10.1 | -5.2 | -3.8 | 0 | 0 |
| Contrast example 1 | -1.2 | 13.3 | 9.6 | -10.2 | 3.6 | 16.1 |
| Contrast example 2 | -8.5 | 14.8 | 5.2 | -9.8 | 7.4 | 12.0 |
| Light source of embodiment | -3.2 | 10.6 | 2.9 | -8.3 | 0.6 | 9.3 |

Fig. 7

LIGHT SOURCE MODULE AND DISPLAY MODULE

CROSS-REFERENCE TO RELATED APPLICATION

This application claims priority to Taiwan application Ser. No. 112101304, filed Jan. 12, 2023, which is herein incorporated by reference in its entirety.

BACKGROUND

Field of Invention

The present invention relates to light source module and display module. More particularly, the present invention relates to light source module and display module including a light emitting device providing a first light having a wavelength in a range from 480 nm to 650 nm.

Description of Related Art

Because a reflective display apparatus does not emit light itself, it is very dependent on an external light source. Once being in an ambient with the weak external light source, the reflective display panel cannot clearly display an image. Therefore, a light source module can be disposed in front of the reflective display panel such that when the external light source is insufficient, the light source module can provide an enough light to the reflective display panel to facilitate displaying an image.

Recently, the reflective display apparatus has used a light emitting diode as a light source of the light source module. A white light emitting diode (LED) uses a LED chip which emits a blue light to excite a yellow phosphor. The blue light and the excited yellow light combine to produce a white light. However, in the reflective display apparatus, there is a color difference (or a color shift) between the light source module being on and off. The color difference is sufficient to be distinguished for a user.

SUMMARY

The disclosure provides a light source module and a display module to reduce a color shift between the light source module being on and off.

The disclosure provides a light source module including a light guide plate and a light source. The light guide plate includes a light entrance surface. The light source is disposed adjacent to the light entrance surface. The light source includes a light emitting device, a first wavelength conversion unit and a second wavelength conversion unit. The light emitting device is configured to emit a blue light. The first wavelength conversion unit is disposed on the light emitting device. When the blue light is incident to the first wavelength conversion unit, the blue light is converted into a first light. The first light has a wavelength in a range from 480 nm to 650 nm. The second wavelength conversion unit is disposed on the light emitting device. When the blue light is incident to the second wavelength conversion unit, the blue light is converted to a second light. The second light has a wavelength different from the wavelength of the first light. The blue light, the first light and the second light combine to produce a white light.

According to an embodiment of the present disclosure, the first light has an intensity being 25% to 60% of a maximum intensity of the blue light.

According to an embodiment of the present disclosure, the first light in a range from 500 nm to 530 nm has an intensity being 25% to 60% of a maximum intensity of the blue light.

According to an embodiment of the present disclosure, the white light has a color temperature in a range from 5000 K to 7000 K.

According to an embodiment of the present disclosure, the first wavelength conversion unit comprises a cyan phosphor.

According to an embodiment of the present disclosure, the first wavelength conversion unit further comprises a green phosphor.

According to an embodiment of the present disclosure, the first wavelength conversion unit further comprises a yellow phosphor.

According to an embodiment of the present disclosure, the second wavelength conversion unit further comprises a red phosphor.

The disclosure provides a display module including a light guide plate, a light source and a reflective display panel. The light guide plate includes a light entrance surface. The light source is disposed adjacent to the light entrance surface. The light source comprises a light emitting device, a first wavelength conversion unit and a second wavelength conversion unit. The light emitting device is configured to emit a blue light. The first wavelength conversion unit is disposed on the light emitting device. When the blue light is incident to the first wavelength conversion unit, the blue light is converted into a first light. The first light has a wavelength in a range from 480 nm to 650 nm. The second wavelength conversion unit is disposed on the light emitting device. When the blue light is incident to the second wavelength conversion unit, the blue light is converted to a second light. The second light has a wavelength different from the wavelength of the first light. The blue light, the first light and the second light combine to produce a white light. The reflective display panel is disposed on the light guide plate.

According to an embodiment of the present disclosure, the reflective display panel further comprises a color filter layer.

Based on above, the light emitting device of the light source module is configured to emit a blue light. The first wavelength conversion unit is on the light emitting device. When the blue light is incident to the first wavelength conversion unit, the blue light is converted to a first light. The first light has a wavelength in a range from 480 nm to 650 nm. Therefore, a problem of excessive reflectance difference of each band in the reflective display panel can be compensated. For example, a color shift of the same color between the light source module being on and off can be effectively reduced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
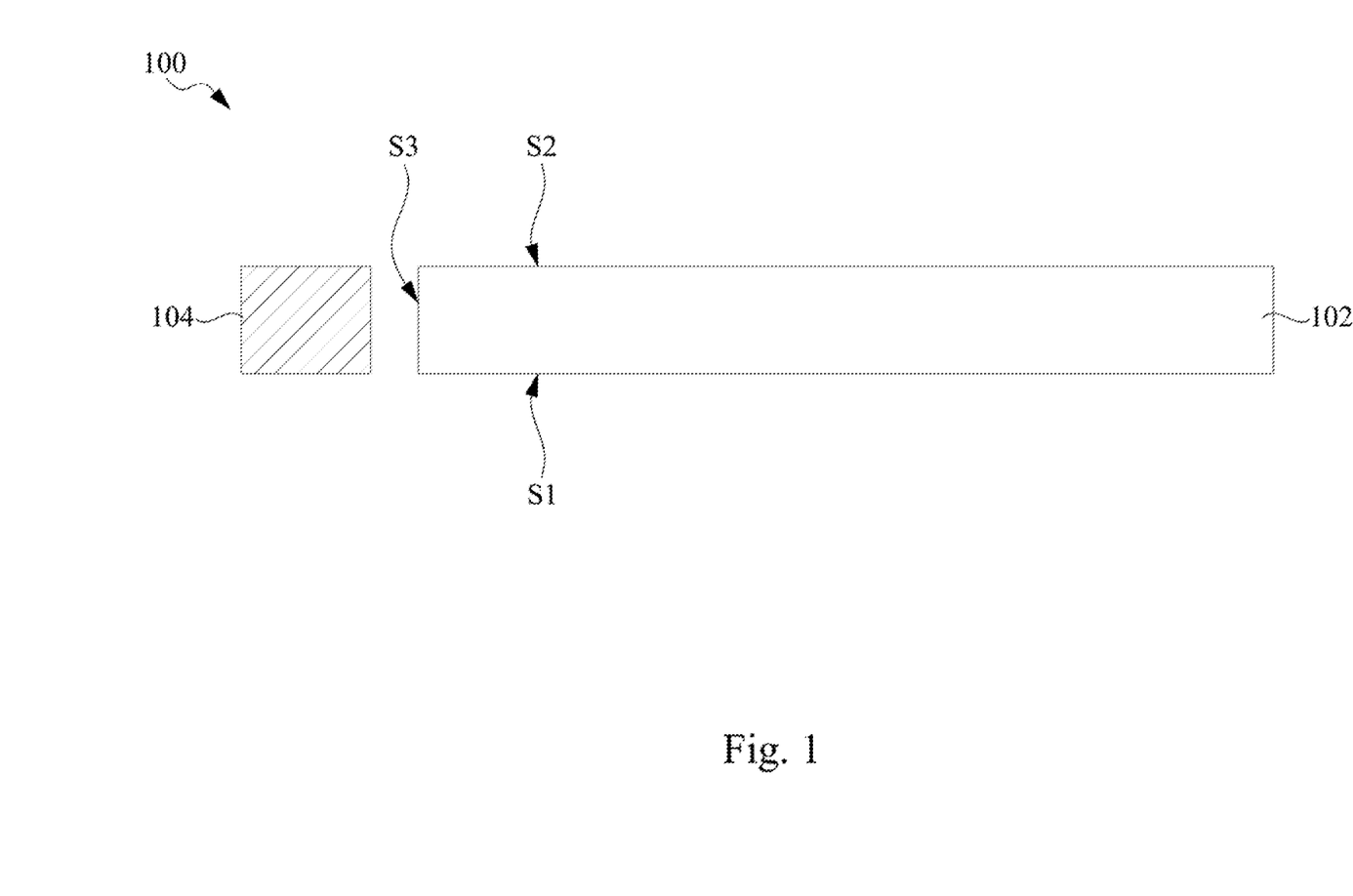
FIG. 1 is a cross-sectional view of a light source module in accordance with some embodiments of the present disclosure.

FIG. 1 is a cross-sectional view of a light source module 100 in accordance with some embodiments of the present disclosure. Reference is made to FIG. 1. In some embodiments, the light source module 100 includes a light guide plate 102 and a light source 104. The light guide plate 102 includes a first surface S1, a second surface S2 and a light entrance surface S3. The first surface S1 is opposite to the second surface S2. The light entrance surface S3 abuts the first surface S1 and the second surface S2. For example, the first surface S1 and the second surface S2 are parallel substantially, and the light entrance surface S3 is a plane surface. In some other embodiments, the first surface S1 may be not parallel to the second surface S2, and the light entrance surface S3 can be, for example, an arc surface, such as a concave surface or a convex surface. In an embodiment, the light source module 100 is, for example, a front light source module.

Figure 2:
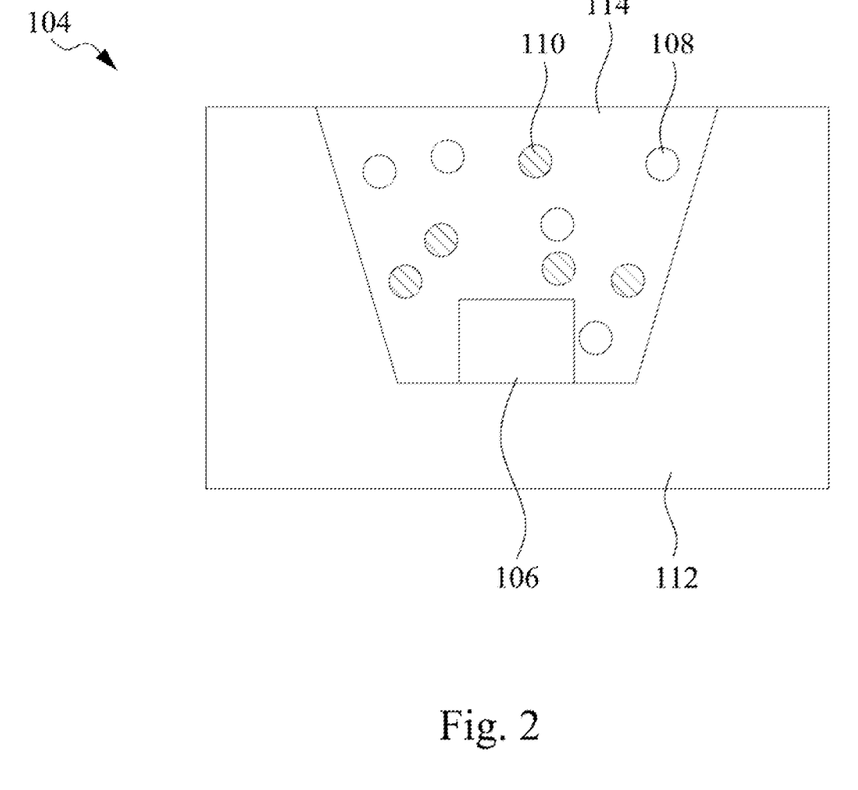
FIG. 2 is a cross-sectional view of a light source in accordance with some embodiments of the present disclosure.

In some embodiments, the light source 104 is disposed adjacent to the light entrance surface S3 and is configured to be incident to the light guide plate 102. The light source 104 and the light guide plate 102 can have a gap therebetween, or can be in contact with each other. FIG. 2 is a cross-sectional view of a light source 104 in accordance with some embodiments of the present disclosure. Reference is made to FIG. 2. The light source 104 includes a light emitting device 106, a first wavelength conversion unit 108 and a second wavelength conversion unit 110. The light emitting device 106 is, for example, a light emitting diode (LED) device, which may be a LED device including a single LED chip or may be a LED device including a plurality of LED chips. In an embodiment, the light emitting device 106 is a light emitting bar made of a plurality of LED chips. The light source 104 can further include a case 112 and a transparent glue 114. The light emitting device 106 is disposed in a receiving space of a recess of the case 112. The first wavelength conversion unit 108 and the second wavelength conversion unit 110 are distributed in the transparent glue 114. The transparent glue 114 covers the light emitting device 106.

In some embodiments, the light emitting device 106 is configured to emit a blue light. In other words, the light emitting device 106 is a blue light emitting device. The blue light has a wavelength in a range from 440 nm to 460 nm. The first wavelength conversion unit 108 is disposed on the light emitting device 106. When the blue light is incident to the first wavelength conversion unit 108, the blue light is converted to a first light. The first light has a wavelength in a range from 480 nm to 650 nm.

Figure 3:
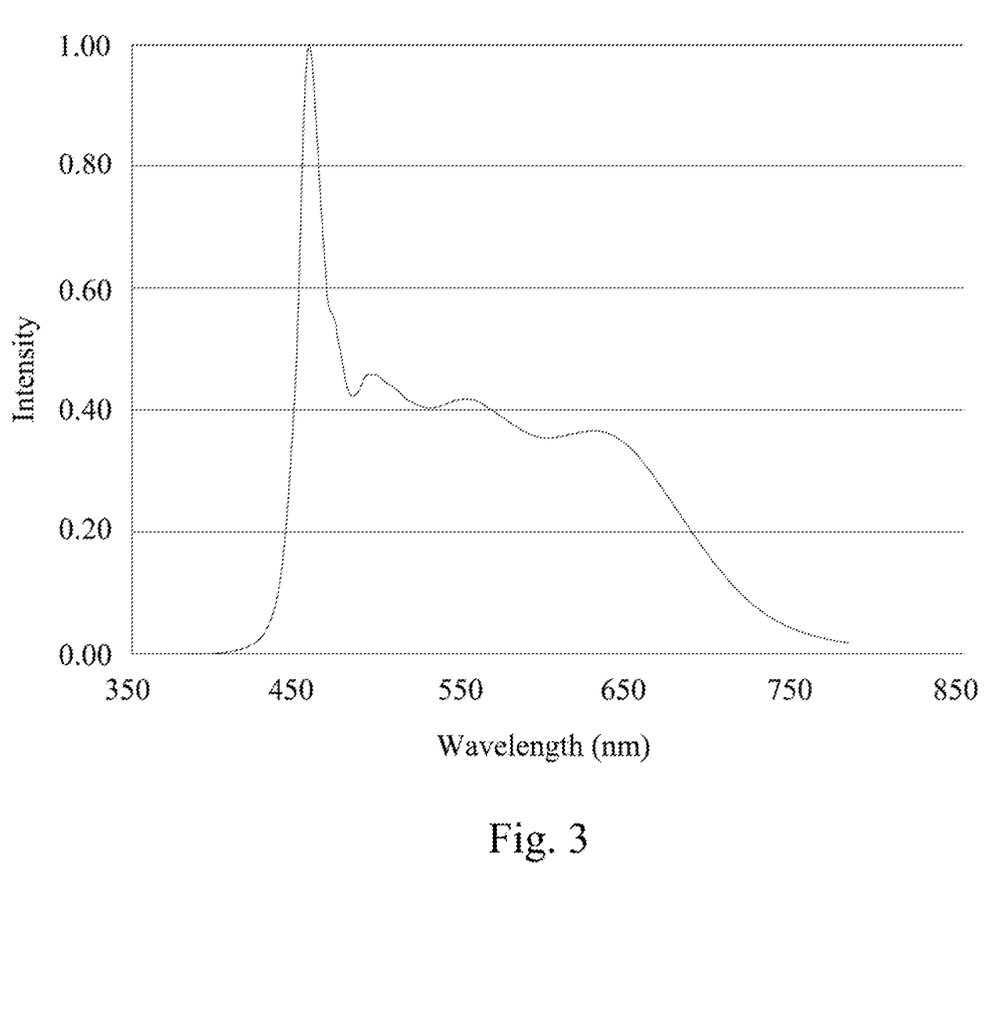
FIG. 3 is an emission spectrum of the light source of FIG. 2.

FIG. 3 is an emission spectrum of the light source 104 of FIG. 2. Reference is made to FIG. 3. Because the first light has the wavelength in a range from 480 nm to 650 nm, including light with a wavelength in a range from 500 nm to 530 nm, that is, including light being greenish.

Figure 4:
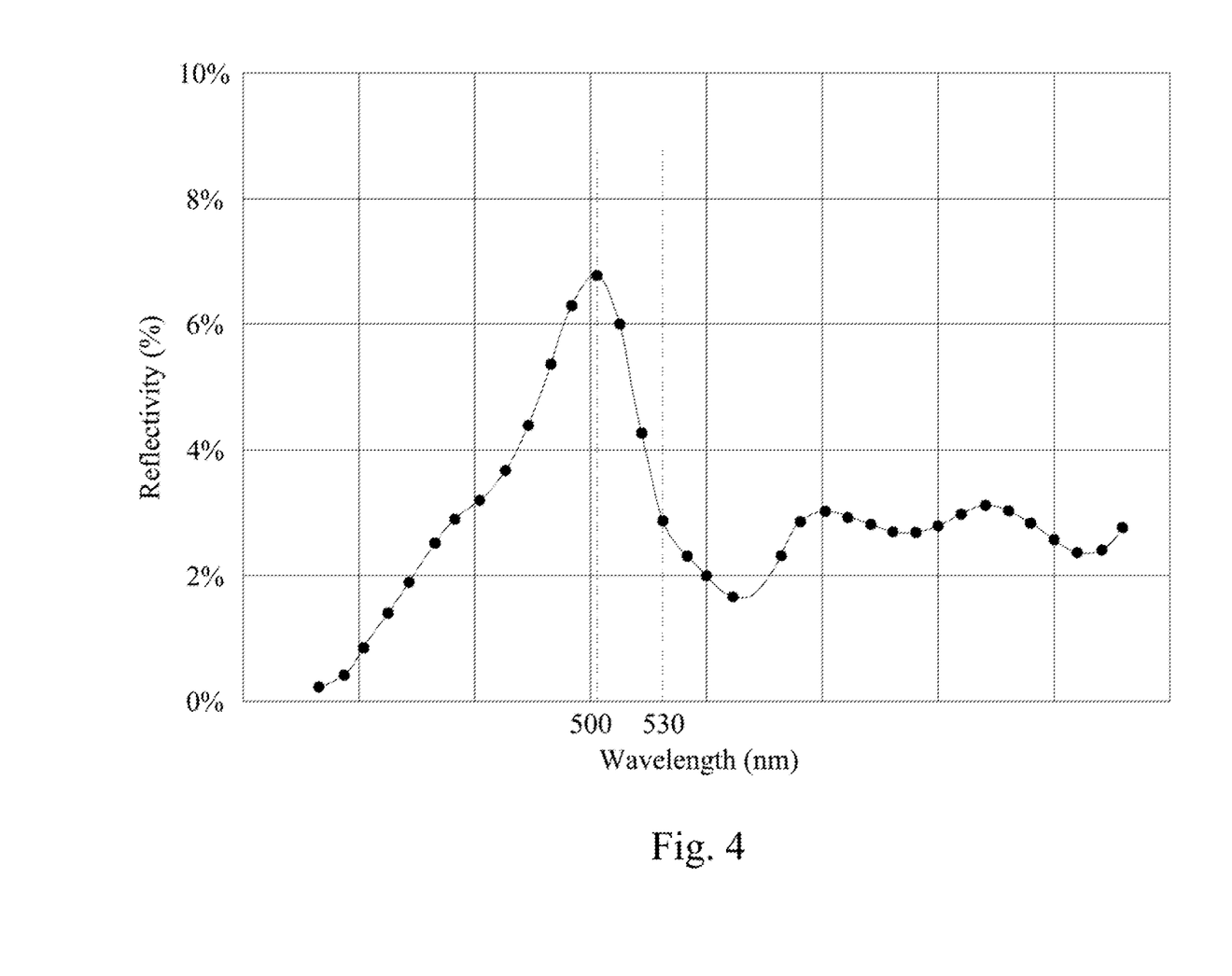
FIG. 4 is a reflectance spectrum of a reflective display panel in accordance with some embodiments of the present disclosure.

FIG. 4 is a reflectance spectrum of a reflective display panel 116 (see FIG. 5) in accordance with some embodiments of the present disclosure. The reflective display panel 116 can be a color reflective display panel. Reference is made to FIG. 4. In the reflective display panel 116 (see FIG. 5), the red light and the blue light have good reflectivities. A light with a wavelength being about 500 nm has a transmittance greater than a transmittance of a light with a wavelength being about 550 nm. In some embodiments, the light with the wavelength being about 500 nm has a transmittance being 3 to 4 times of the light with the wavelength being about 550 nm. In some other embodiments, the light with the wavelength being about 500 nm has the transmittance of about 6%. The light with the wavelength being about 550 nm has the transmittance of about 2%. Therefore, if the LED of the reflective display panel 116 (see FIG. 5) lacks the light with the wavelength being 500 nm, for example, lacks of cyan light or yellow-green light, it will cause a black screen of a display image of the reflective display panel 116 (see FIG. 5) looks like purple or blue-purple.

Referring back to FIG. 1 and FIG. 3, the emission spectrum of the light source 104 according to the present embodiment allows the black screen of the display image of the reflective display panel 116 (see FIG. 5) to be close to black by complementing the light with the wavelength in a range from 500 nm to 530 nm. Therefore, a problem of excessive reflectance difference of each band in the reflective display panel can be compensated. A color shift between the light source module 100 being on and off can be reduced. For example, a color shift of the same color between the light source module 100 being on and off can be effectively reduced.

In some embodiments, the first light has an intensity being 25% to 60% of a maximum intensity of the blue light. In some embodiments, the first light in a range from 500 nm to 530 nm has an intensity being 25% to 60% of the maximum intensity of the blue light. In some embodiments, the first light of about 500 nm has an intensity being 25% to 60% of the maximum intensity of the blue light.

The second wavelength conversion unit 110 is disposed on the light emitting device 106. When the blue light is incident to the second wavelength conversion unit, the blue light is converted into a second light. The second light has a wavelength different from the wavelength of the first light. For example, the second wavelength conversion unit 110 is a red phosphor. The second light is a red light. The blue light, the first light and the second light combine to produce a white light. When the first light has a wavelength in a range from 480 nm to 650 nm, the color temperature of the white light of the light source 104 can be kept within a specific color temperature range. For example, in some embodiments, the white light has a color temperature in a range from 5000 K to 7000 K, such as 6500 K.

In some embodiments, the first wavelength conversion unit 108 includes a cyan phosphor, and the second wavelength conversion unit 110 includes a red phosphor. In some embodiments, the first wavelength conversion unit 108 includes a cyan phosphor and a green phosphor, and the second wavelength conversion unit 110 includes a red phosphor. In some embodiments, the first wavelength conversion unit 108 includes a cyan phosphor and a yellow phosphor, and the second wavelength conversion unit 110 includes a red phosphor. In some embodiments, the first wavelength conversion unit 108 includes a cyan phosphor, a green phosphor and a yellow phosphor, and the second wavelength conversion unit 110 includes a red phosphor.

Figure 5:
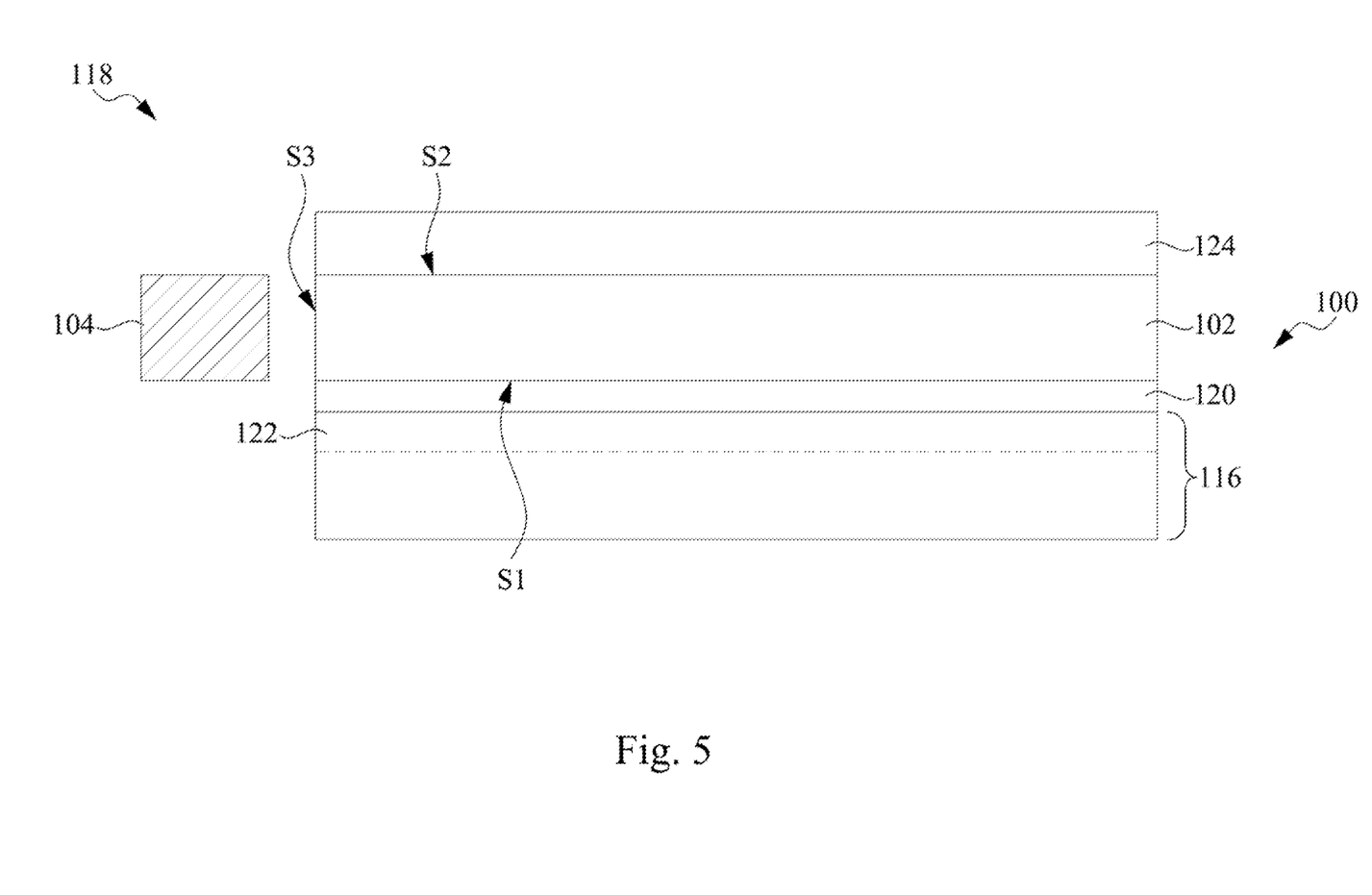
FIG. 5 is a cross-sectional view of a display module in accordance with some embodiments of the present disclosure.
Figure 6:
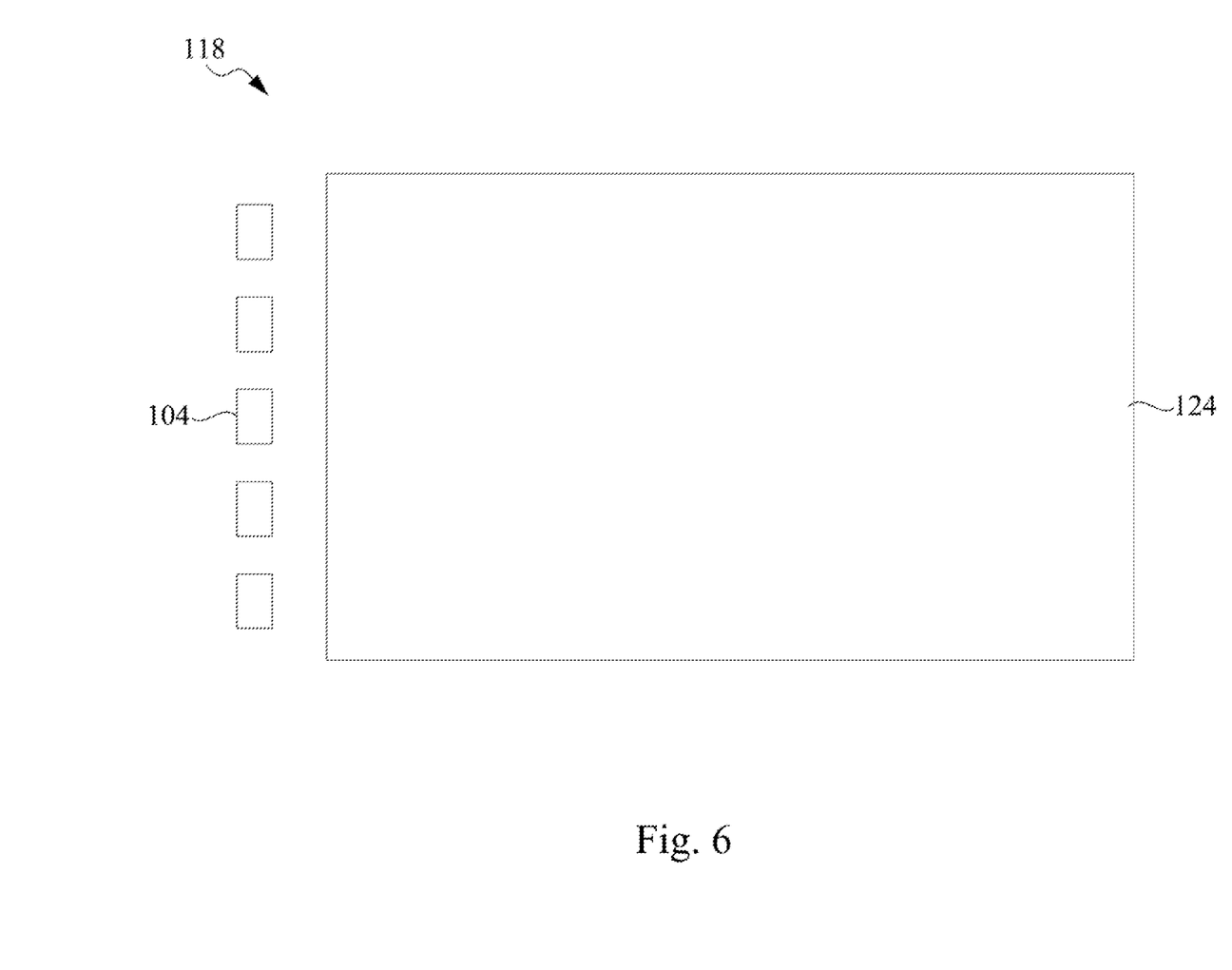
FIG. 6 is a top view of the display module in accordance with some embodiments of the present disclosure.

FIG. 5 is a cross-sectional view of a display module 118 in accordance with some embodiments of the present disclosure. FIG. 6 is a top view of the display module 118 in accordance with some embodiments of the present disclosure. Referring to FIGS. 5 and 6, the display module 118 includes a light guide plate 102, a light source 104 and a reflective display panel 116. The light guide plate 102 includes a light entrance surface S3. The light source 104 is disposed adjacent to the light entrance surface S3. The light guide plate 102 and the light source 104 are similar to those discussed previously to FIGS. 1 and 2. Reference is made to FIGS. 5, 6 and 2. The light source 104 includes a light emitting device 106, a first wavelength conversion unit 108 and a second wavelength conversion unit 110. The light emitting device 106 is configured to emit the blue light. The number of the light emitting devices 106 shown is an example, and the present disclosure is not limited thereto.

The first wavelength conversion unit 108 is disposed on the light emitting device 106. When the blue light is incident to the first wavelength conversion unit 108, the blue light is converted into a first light. The first light has a wavelength in a range from 480 nm to 650 nm. The second wavelength conversion unit 110 is disposed on the light emitting device 106. When the blue light is incident to the second wavelength conversion unit 110, the blue light is converted to a second light. The second light has a wavelength different from the wavelength of the first light. The blue light, the first light and the second light combine to produce a white light.

The reflective display panel 116 is disposed on the light guide plate 102. For example, the reflective display panel 116 is disposed on the first surface S1 of the light guide plate 102. In some embodiments, the display module 118 further includes an adhesive layer 120 disposed between the reflective display panel 116 and the light guide plate 102 to fix the reflective display panel 116 and the light guide plate 102. The adhesive layer 120 has a material such as optically clear adhesive (OCA) or an adhesive material of other types. After the light emitted by the light source 104 enters the light guide plate 102 through the light entrance surface S3 of the light guide plate 102, it can travel in the light guide plate 102 by total reflection. The display module 118 reflects the light to a viewer through the reflective display panel 116, thereby achieving displaying an image. The reflective display panel 116 can be an electrophoretic display panel or a liquid crystal display panel.

In an embodiment of the present disclosure, the reflective display panel 116 further includes a color filter layer 122. The color filter layer 122 is disposed on the first surface S1 of the light guide plate 102. The color filter layer 122 includes a plurality of sub-pixels. For example, each of the sub-pixels can correspond to a red sub-pixel, a blue sub-pixel and a green sub-pixel, respectively. The display module 118 may further include a cover plate 124 disposed on the light guide plate 102, such as on the second surface S2 of the light guide plate 102.

Figure 7:
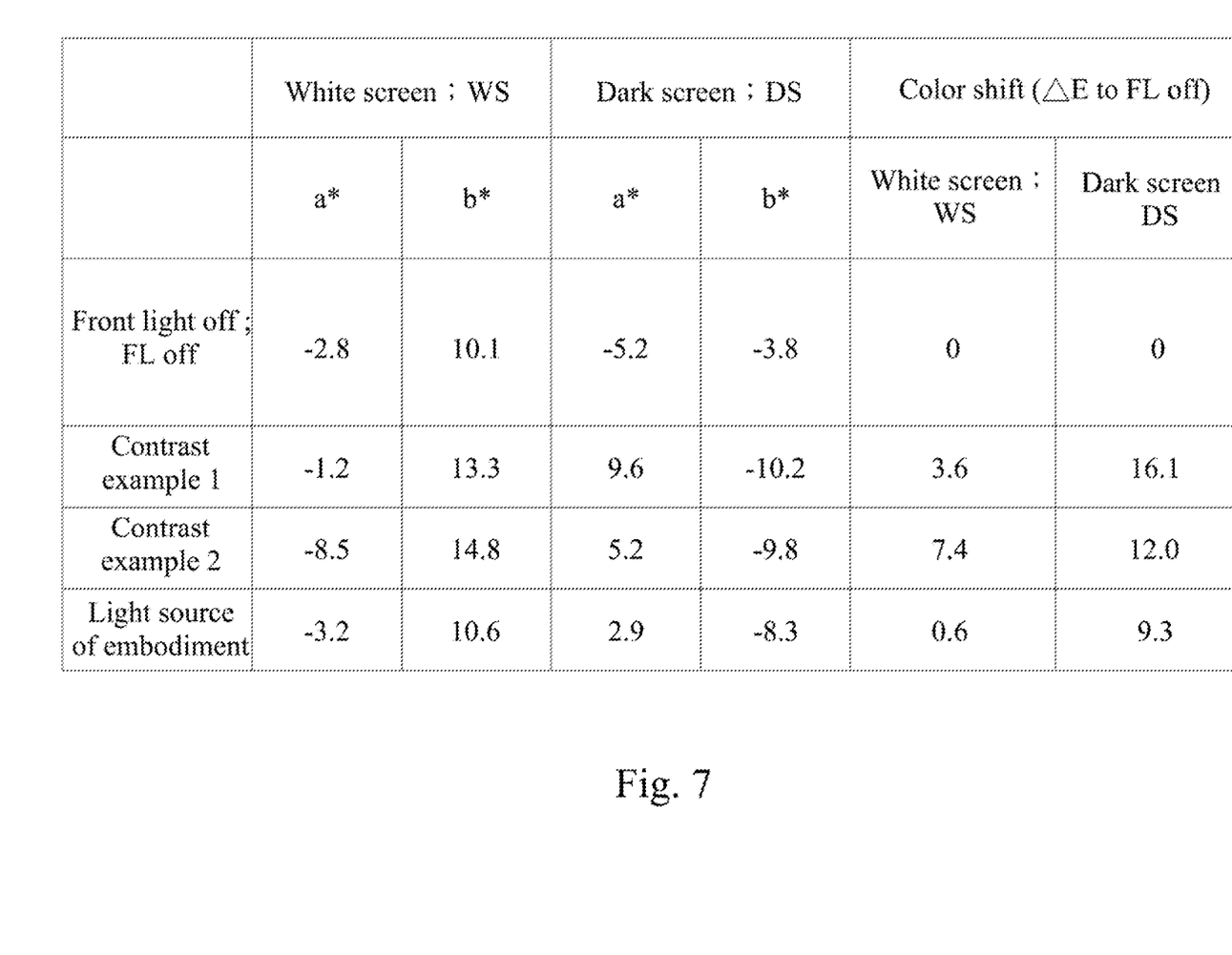
FIG. 7 shows chromaticity coordinates a*, b* of the light source in accordance with some embodiments of present disclosure and a light source of contrast examples at the white screen and the black screen, and a color shift thereof at the white screen and the black screen when the light source module being on and off, respectively.

FIG. 7 shows chromaticity coordinates a*, b* of the light source in accordance with some embodiments of present disclosure and a light source of a comparative example at the white screen and the black screen, and a color shift thereof at the white screen and the black screen when the light source module being on and off, respectively. Reference is made to FIG. 7. A contrast example 1 is a light source including a KSF phosphor and a green light emitting diode. A contrast example 2 is a light source including a yellow phosphor and a blue light emitting diode. In some embodiments of the present disclosure where the light source is the light source 104 (see FIG. 5), compared to the contrast example 1 and the contrast example 2, the light source according to some embodiments of the present disclosure has a reduced color shift at the white screen and the black screen when the light source module 100 (see FIG. 5) being on and off. When the light source module 100 (see FIG. 5) is turned off, it means that only ambient light source exists.

Based on above, the light emitting device of the light source module according to the present disclosure is configured to emit a blue light. The first wavelength conversion unit is disposed on the light emitting device. When the blue light is incident to the first wavelength conversion unit, the blue light is converted to a first light. The first light has a wavelength in a range from 480 nm to 650 nm. Therefore, a problem of excessive reflectance difference of each band in the reflective display panel can be compensated. A color shift between the light source module being on and off can be reduced. For example, a color shift of the same color between the light source module being on and off can be effectively reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A light source module, comprising:
a light guide plate, comprising a light entrance surface; and
a light source disposed adjacent to the light entrance surface, wherein the light source comprises:
a light emitting device configured to emit a blue light;
a first wavelength conversion unit disposed on the light emitting device, wherein when the blue light is incident to the first wavelength conversion unit, the blue light is converted into a first light, the first light has a wavelength in a range from 480 nm to 650 nm, the first wavelength conversion unit is consisting of phosphor;
a second wavelength conversion unit disposed on the light emitting unit, wherein when the blue light is incident to the second wavelength conversion unit, the blue light is converted to a second light, the second light has a wavelength different from the wavelength of the first light, the blue light, the first light and the second light combine to produce a white light;
a case, wherein the light emitting device is disposed in a receiving space of a recess of the case; and
a transparent glue, wherein the first wavelength conversion unit and the second wavelength conversion unit are distributed in the transparent glue, and the transparent glue covers the light emitting device.

2. The light source module of claim 1, wherein the first light has an intensity being 25% to 60% of a maximum intensity of the blue light.

3. The light source module of claim 1, wherein the first light in a range from 500 nm to 530 nm has an intensity being 25% to 60% of a maximum intensity of the blue light.

4. The light source module of claim 1, wherein the white light has a color temperature in a range from 5000 K to 7000 K.

5. The light source module of claim 1, wherein the first wavelength conversion unit comprises a cyan phosphor.

6. The light source module of claim 3, wherein the first wavelength conversion unit further comprises a green phosphor.

7. The light source module of claim 4, wherein the first wavelength conversion unit further comprises a yellow phosphor.

8. The light source module of claim 1, wherein the second wavelength conversion unit further comprises a red phosphor.

9. A display module, comprising:
a light guide plate, comprising a light entrance surface;
a light source disposed adjacent to the light entrance surface, wherein the light source comprises:
a light emitting device configured to emit a blue light;
a first wavelength conversion unit disposed on the light emitting device, wherein when the blue light is incident to the first wavelength conversion unit, the blue light is converted into a first light, the first light has a wavelength in a range from 480 nm to 650 nm;
a second wavelength conversion unit disposed on the light emitting unit, wherein when the blue light is incident to the second wavelength conversion unit, the blue light is converted to a second light, the second light has a wavelength different from the wavelength of the first light, the blue light, the first light and the second light combine to produce a white light;
a case, wherein the light emitting device is disposed in a receiving space of a recess of the case; and
a transparent glue, wherein the first wavelength conversion unit and the second wavelength conversion unit are distributed in the transparent glue, and the transparent glue covers the light emitting device; and
a reflective display panel disposed on the light guide plate, wherein to the reflective display panel, a light with a wavelength being about 500 nm has a transmittance being 3 to 4 times of a light with a wavelength being about 550 nm to the reflective display panel.

10. The display module of claim 9, wherein the reflective display panel further comprises a color filter layer.

11. The display module of claim 9, further comprising:
a cover plate disposed on the light guide plate.

12. The display module of claim 9, wherein the first light has an intensity being 25% to 60% of a maximum intensity of the blue light.

13. The display module of claim 9, wherein the first light in a range from 500 nm to 530 nm has an intensity being 25% to 60% of a maximum intensity of the blue light.

14. The display module of claim 9, wherein the white light has a color temperature in a range from 5000 K to 7000 K.

15. The display module of claim 9, wherein the first wavelength conversion unit comprises a cyan phosphor.

* * * * *